Sept. 9, 1947. D. L. GODBEY 2,427,132
MOTORIZED VEHICLE AND TRANSMISSION THEREFOR
Filed July 7, 1945 3 Sheets-Sheet 1

INVENTOR.
DEXTER L. GODBEY
BY
ATTORNEYS

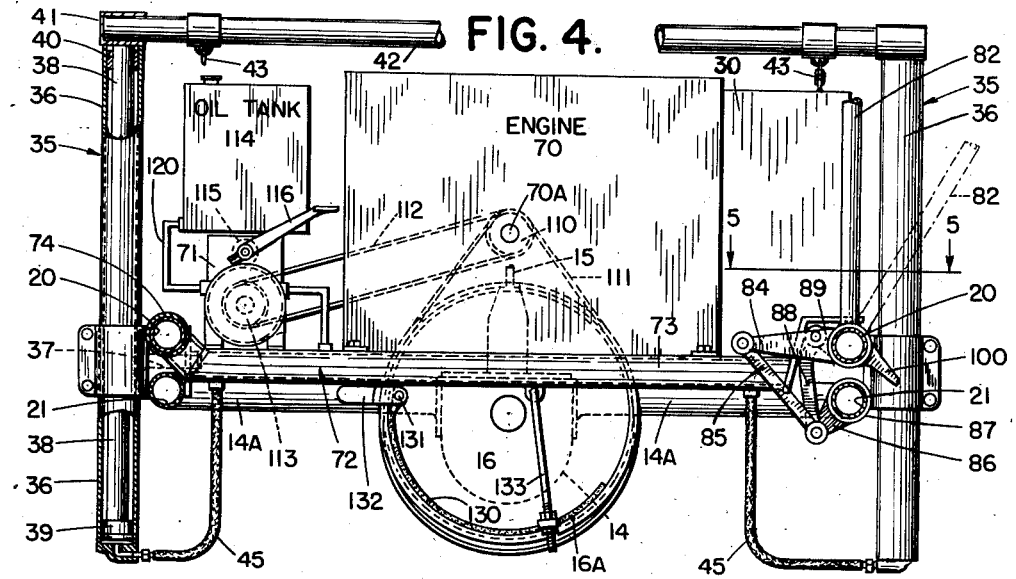

Sept. 9, 1947.　　　D. L. GODBEY　　　2,427,132
MOTORIZED VEHICLE AND TRANSMISSION THEREFOR
Filed July 7, 1945　　　3 Sheets-Sheet 3

INVENTOR
DEXTER L. GODBEY
BY
ATTORNEYS

Patented Sept. 9, 1947

2,427,132

UNITED STATES PATENT OFFICE 2,427,132

MOTORIZED VEHICLE AND TRANSMISSION THEREFOR

Dexter L. Godbey, Long Beach, Calif.

Application July 7, 1945, Serial No. 603,627

6 Claims. (Cl. 180—70)

This invention relates to load-carrying and dumping vehicles, and particularly to small vehicles of that type and character. The general object and purpose of the invention is to provide a motor driven wheelbarrow which is easily operable and maneuverable in restricted spaces, which is simple in its operation and control so that it may be operated by unskilled labor, and which is simple, inexpensive, strong and rugged in its construction and operation, and proof against damage by unskilled manipulation.

Other objects and corresponding accomplishments of the invention, and the invention itself, will be best understood from the following detailed description of the present preferred form of motorized wheelbarrow which is illustrative of the invention, reference for that purpose being had to the accompanying drawings in which:

Fig. 4 is an enlarged transverse sectional elevation taken as indicated by line 4—4 on Fig. 1;

Fig. 5 is a detail plan taken as indicated by line 5—5 on Fig. 4;

Fig. 5A is a detail section taken as indicated by line 5A—5A on Fig. 5;

Fig. 6 is a diagrammatic illustration of the hydraulic system which operates and controls the dumping hopper of the wheelbarrow.

Figures 1, 2, 3:
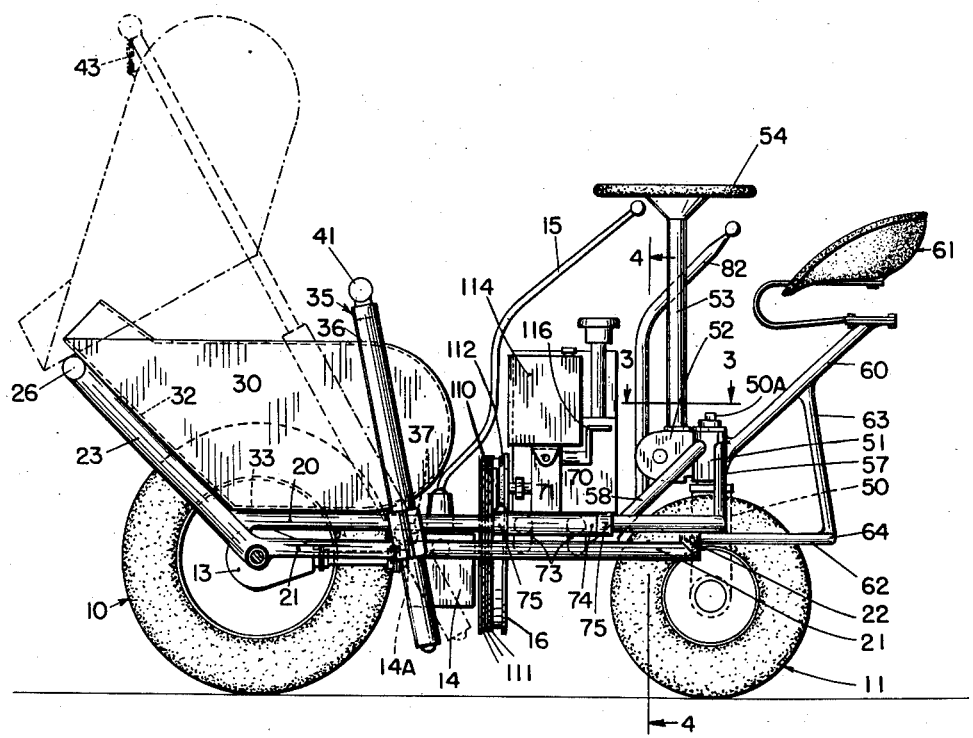
Fig. 1 is a side elevation, with certain parts in section, of a preferred form of the motorized wheelbarrow.
Fig. 2 is a front end elevation of the same.
Fig. 3 is a detail plan section taken as indicated by line 3—3 on Fig. 1.

As here illustrated, the wheelbarrow is mounted on three ground wheels, two front driving wheels 10 and a single dirigible rear wheel 11. The two front wheels 10 are mounted on a front axle structure which includes axle housing 12 and a differential in a casing 13. The details of this structure, and the actual driving axle, are not shown, as those parts of the structure are conventional. The differential is driven from a change-gear and reversing transmission which is also conventional and is merely shown exteriorly at 14. This change-gear transmission has the gear shift lever 15, and is driven by the transmission drive pulley 16. Transmission 14 is mounted in the main frame of the wheelbarrow in a fixed position, as for instance by the transverse frame members 14A (see Fig. 4) which are connected at their outer ends with certain longitudinal side frame members 21 which are hereinafter described.

The main framing of the device is preferably constructed of tubular members, preferably steel tubing. Two longitudinal side frames are each composed of an upper longitudinal tubing element 20 and a lower longitudinal tubing element 21. These longitudinal tubes are connected together at or near their rear ends by the welded connector 22, and connected together at their forward ends by the welding of lower tube 21 to axle housing 12 and the welding of upper tube 20 to the forwardly inclined hopper supporting post 23 which is welded at its lower end to axle housing 12. The longitudinal frame structure which has just been described is duplicated at the opposite sides of the device, the two side frames lying just inside the two front wheels 10.

The two inclined hopper-supporting posts 23 are joined together at their upper ends by a piece of tubing 25 which at its ends extends into and is welded into the L-shaped head structure 26 of posts 23. The transverse tube or rod 25 becomes the pivot or hinge-pin for the dumping hopper 30. Hopper 30 has a piece of tubing 31 welded to it near the upper edge of its forward inclined wall 32, and tubing 31 loosely surrounds the framing tube 25 to rotate thereon. In its normal lowered position the inclined front wall 32 of hopper 30 may rest against the inclined posts 23 as shown in Fig. 1, and the horizontal bottom wall 33 may also preferably rest upon the upper longitudinal frame elements 20.

To dump, the hopper is raised to the position shown in dotted lines in Fig. 1, by the operation of two hydraulic lifts which are generally designated by the numeral 35. Each of the hydraulic lifts 35 preferably comprises a simple cylinder 36 pivotally mounted on the side frames at points 37 to swing in vertical longitudinal planes. In each cylinder there is a plunger 38 with a plunger head 39 on its lower end. The upper end of each cylinder 36 has a guide bushing 40 which acts as a stop, contacted by plunger head 39, to limit the raising action of the plunger to such a position as is shown in dotted lines in Fig. 1. Each plunger has a short piece of tubing 41 welded to it at its upper end, and a cross connecting tube 42 is welded into the two heads 41 to cross-connect the two plungers. A pair of chain linkages or similar connectors 43 connect crosstube 42 with the upper rear part of the hopper. Pressure fluid, preferably oil, is fed into and exhausted from the lower end of cylinders 35 through flexible hoses or tubes 45 whose connections will be hereinafter described.

The single rear dirigible wheel 11 is carried on a simple one-sided yoke member 50 which is mounted on a vertical steering pin 50A in the vertical bearing member 51. This vertical bearing member 51, and the steering gear which is housed in casing 52, the steering post 53 and steering wheel 54, and also the steering linkage connection 55 between the steering gear and the vertical steering pin 50A, may be conventional and need no detailed description.

Figure 7:
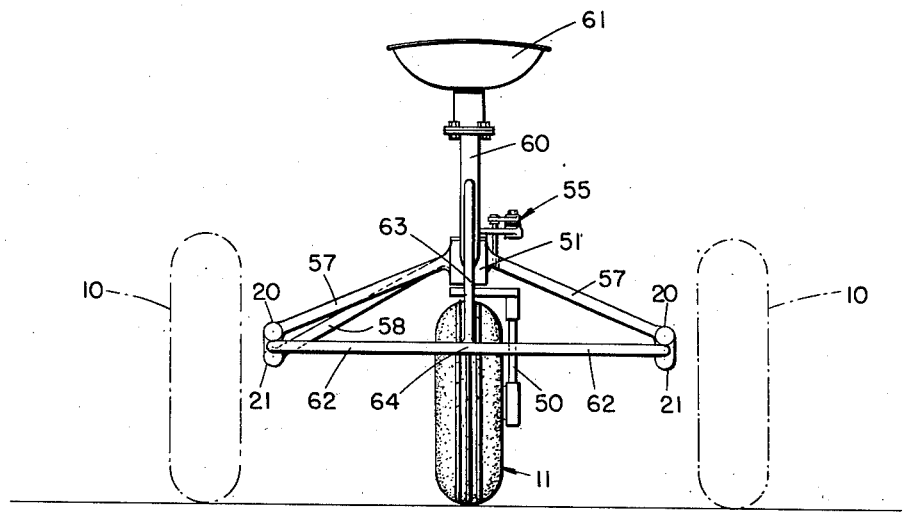
Fig. 7 is a rear end elevation of the wheelbarrow mechanism; parts forward of the rear framing being omitted for clarity of illustration.

The vertical bearing casing 51 is mounted and connected into the framing of the wheelbarrow by the framing and bracing elements which are best shown in Figs. 1 and 7. Two upwardly and inwardly inclined framing and bracing members 57 are welded to the two opposite upper longitudinal frame members 20 at their rear ends, and are also welded to bearing casing 51. On either one or both sides of the framing, another bracing element 58 may be welded into connection between the lower longitudinal frame member 21 and casing 51. An inclined seat-supporting post 60 is welded at its lower forward end to 51 and supports seat 61 at its upper end. A bracing framing, consisting of two horizontal elements 62 and a central upright element 63, serves both to tie together the rear ends of the two longitudinal frame units 20, 21 and to brace seat post 60. The two horizontal brace elements 62 are welded at their outer forward ends to members 22 of the side frames, and extend diagonally rearwardly and inwardly, meeting at an apex at 64 where they are welded together and to the lower end of upright brace 63.

The engine which drives the mechanism is here shown at 70 simply as an engine block with a crank shaft 70A on a fore-and-aft axis. The engine, and also the oil pump 71, are mounted on a pivoted transverse frame which is generally designated by the numeral 72 and which is made up of two transversely extending tubular members 73 each of which is attached by welding at one end (the left hand end as shown in Fig. 4) to a hinge tube 74 which surrounds one of the upper side frame tubes 20 and thus forms a hinge pivot about which the transverse engine supporting frame 72 may swing in a vertical transverse plane. This transverse swinging frame 72 is located, as indicated in Fig. 1, directly behind the large transmission drive pulley 16, and is confined longitudinally by any suitable means, as by a pair of stop collars 75 secured on longitudinal frame member 20 at the opposite ends of hinge tube 74.

The right-hand ends of transverse frame members 73, as shown in Figs. 4 and 5, are interconnected by being welded to a bracket member 76 which has an upper horizontally extending flange 77 which overhangs the upper longitudinal frame member 20 as shown in Fig. 4.

Mounted on the upper side-frame tube 20 under flange 77 is a sleeve of tubing 80, rotatable on tube 20. See Figs. 5 and 5A. This sleeve 80 carries a cam 81 lying under flange 77, and adapted, by rotation to the dotted line position of Fig. 5A, to raise the bracket 76 to the dotted line position. The right hand end of engine supporting frame 72 is thus raised to such a position as shown in dotted lines in Fig. 5A, the frame swinging about its left-hand hinged end.

As will be readily understood, sleeve 80 and cam 81 could be directly operated by a manual handle, such as the handle shown at 82; but it is preferred to provide a simple leverage and linkage arrangement so that the handle is swung through a smaller angle than the cam travel. Accordingly, another rotatable sleeve 83 is mounted on tube 20 to the rear of sleeve 80, and handle 82 is mounted on sleeve 83. Sleeve 83 has a long arm 84 which is connected by link 85 with a relatively shorter arm 86 on a sleeve 87 rotatably mounted on the lower tube 21. Another link 88 connects arm 86 with an arm 89 on the cam sleeve 80.

The arrangement of linkages and leverages may be made in many different manners; the one shown is typical of a simple arrangement whereby cam 81 will be thrown through the relatively large angle indicated in Fig. 5A while handle 82 is thrown through the relatively small angle shown in Fig. 4. A stop finger 100 on handle sleeve 83 contacts lower tube 21 when cam 81 has been thrown to the dotted line position shown in Fig. 5A, slightly over center so that the weight of the engine frame 72 and its supported parts will tend to hold cam 81 in its elevated position.

A small drive pulley 110 on engine shaft 70A lies directly over transmission drive pulley 16 and a belt or preferably a plurality of narrow belts 111 transmit the drive from pulley 110 to pulley 16. In the position of the parts shown in Fig. 4, with the engine frame lowered, belts 111 are loose. In the raised portion of frame 72 and the engine, the belts are sufficiently tight to transmit ample driving power to the transmission. The belt drive thus forms a convenient disengageable clutch. It may also form a drive which, even with the belt in its taut driving condition, will slip if the operator inadvertently drives the wheelbarrow into an obstruction which stops it. Handle 82 is located conveniently to the operator's seat 61; and it will be noted that, to declutch the engine from the transmission, it is only necessary that the operator pull handle 82 slightly toward him. As soon as cam 81 passes over center the weight of the motor supporting frame and its supported parts will cause the motor frame to drop and loosen the driving belt.

Oil pump 71, also mounted on the transverse engine frame 72, is constantly driven by belt drive 112 from engine pulley 110 to pump pulley 113. The tank 114 which forms a reservoir for the oil supply is mounted directly on the pump; and a control valve, indicated at 115 in Fig. 4, is controlled by the foot lever 116 which is conveniently located for the operator. Pump 71, mounted on the motor supporting frame 72, is driven constantly by the engine whenever the latter is in operation.

The hydraulic system is shown diagrammatically in Fig. 6. Pump 71 may be of any desired character, preferably a simple gear pump. A pump intake line 120 leads from oil reservoir 114 to the intake side of the pump. From the pressure outlet side of the pump a line 121 (or a passage in the pump body) leads to control valve 115 which is here shown in diagram as a plug valve. From the valve a line or passage 122 leads back to the oil reservoir; and in the position of the valve shown in Fig. 6 the pump output is being circulated directly back to the oil reservoir through the valve port 115A. By throwing the valve around clockwise the pump output line 121 will be connected through valve port 115B with output line 123 which leads to one of the transverse frame tubes 73 which is conveniently used as a manifold. From the manifold tube 73 the two flexible tubes 45 lead to the lower ends of hydraulic cylinders 36. Thus, by throwing the valve to the last mentioned position, the pump pressure is put upon the hydraulic cylinders to raise the plungers and the hopper 30.

If the operator fails to throw the valve to its neutral position, disconnecting line 121 from line 123, at or before the time the hydraulic plungers reach their uppermost positions, the stops 40 in the hydraulic cylinders will stop further raising of the hopper, and excess pressure raised by pump 71 will be returned to the oil reservoir through a spring loaded valve 124 which is inserted in line 121 and acts to discharge excess pressure to a line or passage 125 leading back to the reservoir. Normally the operator will throw valve 115 to a position to disconnect line 121 from line 123 when the hopper reaches or approaches its upper position. By then holding the valve in a neutral position, with line 123 stopped off at the valve, the hopper may be held in its upper position for whatever length of time is necessary to dump its contents. By then throwing the valve back to its normal position shown in Fig. 6, where pump output line 121 is connected directly to the oil reservoir through line 122, the pressure line 123 is connected to a line or passage 126 which passes oil back to the reservoir. In that position of the valve the hopper will lower to its normal position under its own weight.

Valve 124, to relieve excess pressure, may preferably be located in line or passage 121 where it will act to relieve excessive pressure either under the circumstances mentioned above or when valve 115 is thrown to a neutral position and line 121 is connected to neither the return line 122 nor to a pressure line 123.

It will be understood that the hydraulic system and valvular control which have been explained are merely typical of the various control systems which may be used.

The operation of the whole mechanism has been largely set out in the foregoing description of its structure. The operator, riding in a position convenient to the several controls, controls the operation of the mechanism by manipulation of clutch lever 82, gear shift lever 15, and valve lever 116, with the engine running constantly. No speed control is shown for the engine; but it may either have its speed manually controlled or it may be a governor controlled engine operating at constant speed. If the engine is of the latter type, the operator controls the movements of the mechanism simply by clutch and gear control.

The wheel base of the mechanism being short, and dirigible wheel 11 being capable of turning on its vertical axis through a large angle, the wheelbarrow is capable of making a complete turn in a circle whose radius is only slightly greater than the length of its wheel base. The operator may thus manipulate the wheelbarrow in very restricted spaces and around sharp turns, both forwardly and rearwardly. Having arrived at a dumping destination with his load, he drives the wheelbarrow up to the dumping position and stops further progress of the mechanism merely by declutching. The engine speed, and the driving ratio between the engine and the driving wheels 10, are such that the wheelbarrow travels at relatively low maximum speed (about ten miles per hour), so that the wheelbarrow is quickly stopped by the automatic brake shown in Fig. 4. A brake shoe 130 is hung at 131 on a bracket 132 mounted on one of the transverse frame tubes 14A. The free end of the shoe is connected by the adjustable bolt 133 with the engine frame 72. When that frame is lowered to declutch, the brake shoe is applied downwardly to the inside of the rim 16A of pulley 16 to bring the wheelbarrow to a stop. The weight of the engine frame and engine is thus utilized to apply the brake. The brake is automatically released by raising the engine frame.

After declutching and applying the brake, with the engine still running and operating the oil pump, the operator then manipulates the control valve to raise the hopper and dump the load and then again manipulates the valve to lower the hopper either before he starts back to the loading point or while he is travelling back to the loading point.

I claim:

1. In a motorized vehicle, the combination of a frame comprising two laterally spaced side frame units and provided with driving ground-engaging wheels, a driving pulley located on a longitudinal axis between the side frame units and drivingly connected to the driving wheels, a transverse frame extending between the two side frame units adjacent the driving pulley, said transverse frame being hinged at one end to one of the side frame units to swing in a vertical transverse plane, a prime mover mounted on the transverse frame and having a drive pulley located above the wheel driving pulley, a transmission belt operating between the two pulleys, and manually operable means mounted on the other side frame unit and adapted to raise and lower the adjacent end of the transverse frame, thereby to tighten and loosen the transmission belt.

2. In a motorized vehicle, the combination as specified in claim 1, and in which each side frame unit comprises a longitudinally extending cylindric tube, the free end of the transverse frame overlying a side frame tube, and a cam rotatable on the tube under the overlying frame.

3. In a motorized vehicle, the combination as specified in claim 1, and in which each side frame unit is composed of an upper and a lower cylindric tube, the free end of the transverse frame having a bracket which overlies an upper side-frame tube, a cam mounted on a sleeve which is rotatable on said upper tube under the overlying bracket, a handle carrying sleeve also mounted rotatably on said upper tube, and a linkage connection between the two said sleeves including a third rotatable sleeve mounted on the lower side frame tube.

4. In a motorized vehicle, the combination of a main frame provided with ground engaging driving wheels, a rotative driving element journalled on a horizontal axis in the frame and drivingly connected with the driving wheels, an engine carrying frame swingably mounted on the main frame to swing in a substantially vertical plane adjacent the driving element, an engine carried on the swinging frame, a power transmission element adapted to be rendered effective to transmit power from the engine to the driving element upon swinging movement of the engine carrying frame in one direction and to be rendered ineffective upon swinging movement of said frame in the opposite direction, a movable braking element adapted to act upon the driving element, means connecting the braking element and the engine carrying frame whereby the braking element is applied to the driving element when said frame is moved in the last mentioned direction, and means for moving the engine carrying frame.

5. In a motorized vehicle, the combination of a main frame provided with ground engaging driving wheels, a rotative driving element journalled in the frame and drivingly connected with the driving wheels, an engine carrying frame mounted on the main frame for movement back and forth to and from the driving element, a power transmission element adapted to be rendered effective to transmit power from the engine to the driving element upon movement of the engine carrying frame in one direction and to be rendered ineffective upon movement of said frame in the opposite direction, a movable braking element adapted to act on the driving element, means connecting the braking element and the engine carrying frame whereby the braking element is applied to the driving element when said frame is moved in the last mentioned direction, and means for moving the engine carrying frame.

6. In a motorized vehicle, the combination of a frame comprising two laterally spaced side frame units and provided with driving ground-engaging wheels, a driving pulley located on a longitudinal axis between the side frame units and drivingly connected to the driving wheels, a transverse frame extending between the two side frame units adjacent the driving pulley, said transverse frame being hinged at one end to one of the side frame units to swing in a vertical transverse plane, a prime mover mounted on the transverse frame and having a drive pulley located above the wheel driving pulley, a transmission belt operating between the two pulleys, manually operable means mounted on the other side frame unit and adapted to raise and lower the adjacent end of the transverse frame, thereby to tighten and loosen the transmission belt, a brake shoe adapted to engage the driving pulley, and connection between the brake shoe and the transverse frame whereby the shoe is applied to said pulley when said frame is lowered.

DEXTER L. GODBEY.

REFERENCES CITED

The following references are of record in the file of this patent:

UNITED STATES PATENTS

| Number | Name | Date |
|---|---|---|
| 1,692,848 | Manierre | Nov. 27, 1928 |
| 2,361,654 | Roberts | Oct. 31, 1944 |
| 1,165,825 | Wood | Dec. 28, 1915 |
| 1,243,184 | Kinkead et al. | Oct. 16, 1917 |
| 910,768 | Anderson | Jan. 26, 1909 |